United States Patent [19]

Malloy Desormeaux

[11] Patent Number: 4,676,621

[45] Date of Patent: Jun. 30, 1987

[54] FRAME COUNTER INITIALIZATION SENSOR FOR TRIGGERING FILM REWIND WHEN CAMERA DOOR OPENED PREMATURELY

[75] Inventor: Stephen G. Malloy Desormeaux, Rochester, N.Y.

[73] Assignee: Eastman Kodak Company, Rochester, N.Y.

[21] Appl. No.: 869,520

[22] Filed: Jun. 2, 1986

[51] Int. Cl.$^4$ .......................... G03B 1/00; G03B 17/36
[52] U.S. Cl. .................................. 354/173.1; 354/214; 354/217
[58] Field of Search ................ 354/173.1, 173.11, 214, 354/215, 217, 218

[56] References Cited

U.S. PATENT DOCUMENTS

| | | | |
|---|---|---|---|
| 4,251,148 | 2/1981 | Stemme et al. | 354/173 |
| 4,281,911 | 8/1981 | Engelsmann et al. | 354/173 |
| 4,297,019 | 10/1981 | Ishii et al. | 354/171 |
| 4,362,370 | 12/1982 | Yoshino | 354/173 |
| 4,419,001 | 12/1983 | Tominaga et al. | 354/173.1 |
| 4,460,256 | 7/1984 | Araki et al. | 354/173.11 |
| 4,494,842 | 1/1985 | Kimura et al. | 354/173.11 |
| 4,504,131 | 3/1985 | Kimura | 354/173.1 |
| 4,568,164 | 2/1986 | Sahori | 354/173.1 |

Primary Examiner—W. B. Perkey
Attorney, Agent, or Firm—Roger A. Fields

[57] ABSTRACT

A photographic camera has a motorized film transport mechanism which is operable to continuously prewind substantially the entire length of a filmstrip from a light-tight cartridge onto a take-up spool without exposing any of the frames on the filmstrip and to intermittently rewind the filmstrip one frame at a time back into the cartridge after each exposure is completed. A frame counter is incremented during prewinding of the filmstrip onto the take-up spool to provide a count of the maximum number of frames to be exposed and is decremented during rewinding of the filmstrip back into the cartridge to provide a count of the remaining number of frames to be exposed. If a rear door of the camera is accidentally or inadvertently opened before the filmstrip is completely wound off the take-up spool, the frame counter is initialized to an original setting. Then, a counter initialization sensor and a film-on-spool sensor cooperate with a control circuit to operate the motorized film transport mechanism to continuously rewind the filmstrip remaining on the take-up spool back into the cartridge.

6 Claims, 6 Drawing Figures

FRAME COUNTER INITIALIZATION SENSOR FOR TRIGGERING FILM REWIND WHEN CAMERA DOOR OPENED PREMATURELY

CROSS-REFERENCE TO RELATED APPLICATIONS

Reference is made to commonly assigned, copending patent applications Ser. No. 829,748, entitled FILM-ON-SPOOL SENSOR FOR PREVENTING INITIALIZATION OF FRAME COUNTER, and filed Feb. 18, 1986 in the name of Stephen Malloy Desormeaux, and Ser. No. 869,523, entitled FILM-ON-SPOOL SENSOR FOR TRIGGERING FILM REWIND WHEN CAMERA DOOR OPENED PREMATURELY, and filed June 2, 1986 in the name of Stephen Malloy Desormeaux.

BACKGROUND OF THE INVENTION

1. Field of the Invention

The invention relates generally to the field of photographic cameras and in particular to those cameras in which a filmstrip is first prewound from a cartridge onto a take-up spool without exposing any of the frames on the filmstrip and then is rewound one frame at a time back into the cartridge after each exposure is completed.

2. Description of the Prior Art

Typically in a number of 35 mm cameras, there is included a motorized film transport mechanism. In operation, a leading end portion of the filmstrip extending from a light-tight cartridge loaded in the camera is attached automatically to a take-up spool. The take-up spool is rotated after each exposure to advance successive frames of the filmstrip from the cartridge across the focal plane of a taking lens and onto the take-up spool. Each time the take-up spool is rotated, an unexposed frame on the filmstrip is located in the focal plane of the taking lens and an exposed frame is wound onto the take-up spool. At the same time, a frame counter is incremented by rotation of a metering sprocket in engagement with successive perforations in the filmstrip to provide a count of the number of frames exposed or remaining to be exposed on the filmstrip. When the fresh film supply has been exhausted, a trailing end portion of the filmstrip remains attached to a supply spool within the cartridge. This end of film condition is signalled by a sudden rise in the film tension as the take-up spool attempts to withdraw the remainder of the filmstrip from the cartridge. A tension sensing mechanism responds to the increase in film tension by reversing the motor drive to rotate the supply spool within the cartridge. The rotated spool draws the exposed filmstrip off the take-up spool and rewinds it into the cartridge. Then, a rear door of the camera is opened and the cartridge is removed in order to process the filmstrip.

Opening the rear door of the camera, for example, to remove a cartridge containing an exposed filmstrip, usually initializes the frame counter to an original empty setting. When a cartridge with a fresh filmstrip is loaded in the camera and the door is re-closed, the frame counter is incremented from its empty setting to a "1" setting in response to advance of the filmstrip to locate the first frame in the focal plane of the taking lens. Failure to initialize the frame counter to its empty setting before the cartridge with the fresh filmstrip is loaded in the camera would result in the frame count being out of synchronization with the exposed frames on the filmstrip.

If the rear door of the camera is accidentally or inadvertently opened before the filmstrip is completely wound off the take-up spool and back into the cartridge, the exposed frames on the take-up spool may be ruined by stray light. To prevent this occurance, cameras have been recently provided with a motorized film transport mechanism which prewinds substantially the entire length of the filmstrip onto the take-up spool before any exposures are taken. Then, after each exposure, the filmstrip is rewound one frame at a time back into the cartridge. Thus, the exposed frames will be protected within the cartridge from stray light should the rear door be opened prematurely.

The frame counter in a camera that first prewinds a fresh filmstrip onto the take-up spool and then rewinds the filmstrip incrementally into the cartridge after each exposure is driven by rotation of the metering sprocket during film movement in both the prewind and rewind directions. When the filmstrip is moved in the prewind direction, the frame counter is incremented to indicate the maximum number of available exposures. Conversely, movement of the filmstrip in the rewind direction decrements the frame counter once after each exposure to indicate the remaining number of available exposures. Opening the rear door of the camera accidentally or inadvertently before the filmstrip is completely wound off the take-up spool usually initializes the counter to its empty setting. This, presumably, serves as a remainder to the photographer to press a button or to otherwise activate the motorized film transport mechanism to rewind the remainder of the filmstrip back into the cartridge.

It has been suggested in U.S. Pat. No. 4,460,256, granted July 17, 1984, that the filmstrip remaining on the take-up spool in an expose on rewind type camera be automatically rewound into the cartridge should the rear door of the camera be opened prematurely. In this instance, the frame counter is not initialized to its empty setting when the door is opened, but instead remains at its numbered setting above "0". Respective switches in the camera operate to sense that the door is open and that the frame counter is at a numbered setting above "0". This combination of events sensed by the switches triggers energization of a film drive motor in a rewind direction. Then, as the filmstrip is rewound into the cartridge, the frame counter is decremented in accordance with rotation of the metering sprocket. When the frame counter is decremented to a "0" setting, the corresponding switch changes state to de-energize the film drive motor. While this arrangement may perform satisfactorily, it is possible that the filmstrip will slip off the metering sprocket during rewind because the rear door is open and, therefore, the filmstrip is not held in engagement with the metering sprocket. As a result, the frame counter may be decremented to its "0" setting to de-energize the drive motor before the filmstrip to completely would off the take-up spool. This is due to the fact in the U.S. Pat. No. 4,460,256 that during rewind the metering sprocket is motor driven to decrement the frame counter at a faster speed than the supply spool within the cartridge is motor driven to wind the filmstrip onto the supply spool. Thus, the photographer may have to unwind some of the filmstrip off the take-up spool and hand feed it into the cartridge.

THE CROSS-REFERENCED APPLICATIONS

Patent application Ser. No. 829,748, cross-referenced above, discloses an expose on rewind type camera in which, when a rear door is opened accidentally with the filmstrip in midroll, a metering sprocket is disengaged from a frame counter. Normally, this would permit the frame counter to be reset to an original empty setting by an initializing spring. However, a film-on-spool sensor sensing the presence of the filmstrip on the take-up spool secures the frame counter in its numbered setting to prevent the counter from being reset by the initializing spring. This allows the frame counter to continue the frame count after the door is re-closed, should the photographer wish to use any frames remaining on the filmstrip which may not be ruined.

Patent application Ser. No. 869,523, cross-referenced above, discloses an expose on rewind type camera in which, when a rear door is opened accidentally with the filmstrip in midroll, respective switches sensing that the door is open and that substantially any filmstrip is present on the take-up spool command a logic circuit to continuously rewind the remaining film back into the cartridge. At the same time, a frame counter is decremented from its numbered setting in accordance with rotation of a metering sprocket. Then, after the take-up spool is emptied, the film-on-spool switch sensing that the filmstrip is removed from the take-up spool commands the logic circuit to de-energize the film drive. Thus, it is assured that the film drive will not be de-energized before the filmstrip is completely wound off the take-up spool, as contrasted to the prior art described above.

SUMMARY OF THE INVENTION

The invention provides a simpler, more reliable camera apparatus than is described above in connection with the prior art and is different than the camera apparatus disclosed in the cross-referenced applications. In particular, the invention provides an improved device for automatically triggering film rewind in an expose on rewind type camera when a camera door is opened prematurely.

According to the invention, there is provided a camera having a motorized film transport mechanism which is operable to continuously prewind substantially the entire length of an unexposed filmstrip from a light-tight cartridge onto a take-up spool without exposing any of the frames on the filmstrip and to intermittently rewind the filmstrip one frame at a time back into the cartridge after each exposure is completed. A frame counter is incremented during prewinding of the filmstrip onto the take-up spool to provide a count of the maximum number of frames to be exposed and is decremented during rewinding of the filmstrip back into the cartridge to provide a count of the remaining number of frames to be exposed. If a rear door of the camera is accidentally or inadvertently opened before the filmstrip is completely wound off the take-up spool, the frame counter is automatically initialized to an original empty setting. Then, a counter initialization sensor sensing that the counter has been initialized and a film-on-spool sensor sensing that the filmstrip is present on the take-up spool cooperate with a control circuit to operate the motorized film transport mechanism to rewind the remainder of the filmstrip back into the cartridge. After the take-up spool is emptied, the counter-initialization sensor and the film-on-spool sensor cooperate with the control circuit to de-energize the transport mechanism. Thus, in a different way than is disclosed in cross-referenced patent application Ser. No. 869,523, it is assured that the transport mechanism will not be de-energized before the filmstrip is completely wound off the take-up spool, as contrasted to the prior art described above.

DESCRIPTION OF THE PREFERRED EMBODIMENT

The invention is disclosed as being embodied preferably in a 35 mm camera. Because the features of this type camera are well known, the description which follows is directed in particular to photographic elements forming part of or cooperating directly with the disclosed embodiment. It is understood, however, that other elements not specifically shown or described may take various forms known to persons of ordinary skill in the art.

In the type of camera to be described those photographic elements shown in the drawings will be assigned successive reference numbers. Other photographic elements not shown in the drawings are well known or conventional and will not be assigned any reference numbers. Thus, in the description which follows, the absence of a reference number in connection with a mentioned element indicates that such element is not shown in the drawings.

Figure 1:
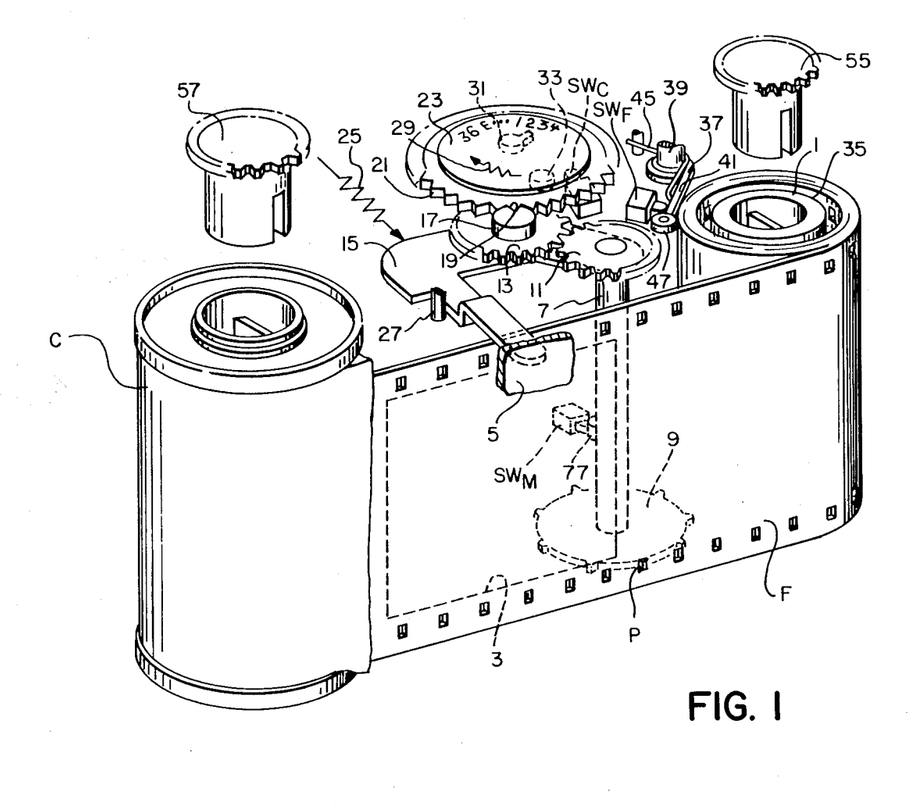
FIG. 1 is a perspective view of an improved apparatus for triggering automatic film rewind when a frame counter is initialized in response to opening a rear door of a camera prematurely, in accordance with a preferred embodiment of the invention.

Referring now to the drawings and in particular to FIG. 1, there is shown certain elements of a 35 mm camera of the type in which substantially the entire length of a filmstrip F is pre-wound from a light-tight film cartridge C onto a take-up spool or drum 1 before any exposures are taken at an aperture 3. Then, after each exposure at the aperature 3, the filmstrip F is rewound one frame at a time back into the cartridge C. This is done to protect the exposed frames on the filmstrip F in the event a rear door 5 of the camera is accidentially or inadvertently opened prematurely, i.e., before the filmstrip is rewound completely into the cartridge.

Figure 2:
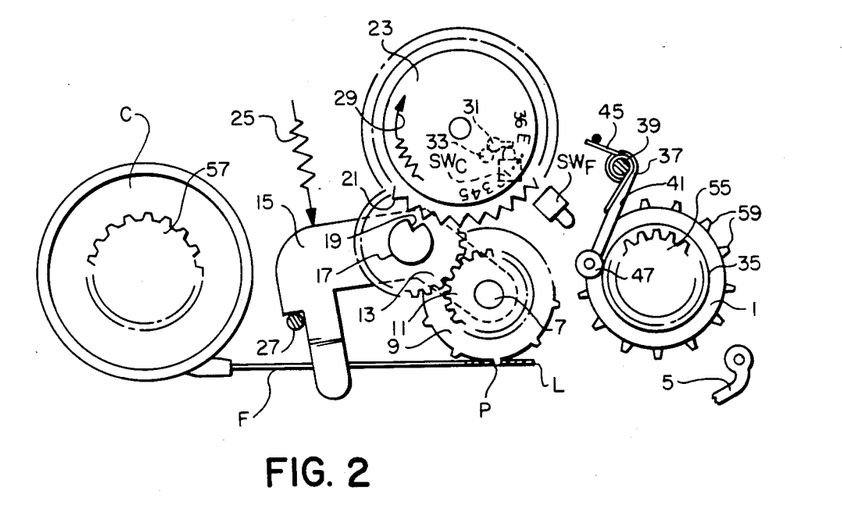
FIG. 2 is a top plan view of the improved apparatus depicted in FIG. 1, shown with the rear door opened.
Figure 3:
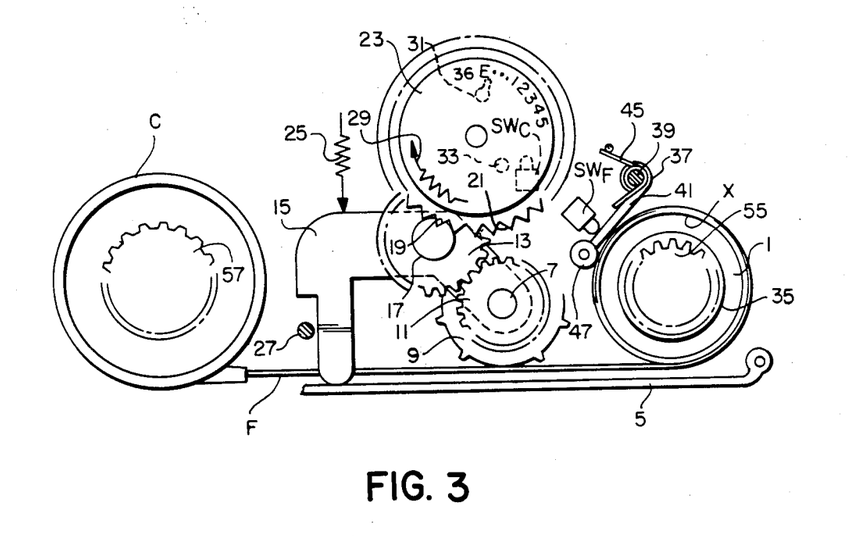
FIG. 3 is a top plan view of the improved apparatus depicted in FIG. 1, shown with the rear door closed.

As shown in FIGS. 1 and 2, a coaxial shaft 7 connects a metering sprocket 9 and a metering gear 11 to enable the sprocket and the gear to rotate in unison. The metering sprocket 9 engages successive perforations P in the filmstrip F as the filmstrip is pre-wound onto the take-up spool 1 and is rewound back into the cartridge C. The metering gear 11 continuously engages a counter gear 13 which is rotatably mounted atop a swing plate 15. The swing plate 15 is supported on the shaft 7, beneath the metering gear 11, for pivotal movement about the shaft without disengaging the counter gear 13 from the metering gear. A motion-transmitting stud 17 is coaxially fixed atop the counter gear 13 and has a single recess 19 for receiving successive peripheral teeth 21 of a rotatable counter disk 23 to rotate the disk in accordance with rotation of the counter gear. When the rear door 5 is closed, as shown in FIG. 3, it abuts against the swing plate 15 to maintain the motion-transmitting stud 17 in a position against at least one of the peripheral teeth 21 of the counter disk 23. The counter disk 23 is located on the outside of the camera and has thirty-six evenly spaced numbered settings represented by the numbers "1, 2, 3, 4, 5, . . . 36" imprinted on the disk. These numbers correspond to successive frames on the filmstrip F. An original empty setting of the counter disk 23 is represented by the letter "E" imprinted on the disk. This is to indicate that the camera is empty.

When the filmstrip F is pre-wound onto the take-up spool 1, the metering sprocket 9 is rotated by pre-winding movement of the filmstrip to increment the counter disk 23 from its original "E" setting to a maximum number setting, such as the "36" setting or a lesser number setting, to indicate the maximum number of unexposed frames on the filmstrip F. Conversely, as the filmstrip F is rewound back into the cartridge C after each exposure is completed, the metering sprocket 9 is rotated by rewinding movement of the filmstrip to decrement the counter disk 23 one setting at a time from its maximum number setting to indicate the remaining number of unexposed frames on the filmstrip. In operation, the metering sprocket 9, the metering gear 11, the counter gear 13, and the motion-transmitting stud 17 are each rotated one revolution between successive frames.

When the rear door 5 is opened, as shown in FIG. 2, a separating spring 25 urges the swing plate 15 to pivot in a counter-clockwise direction about the shaft 7 into abutment against a stop pin 27 on a frame portion of the camera. This will cause the motion-transmitting stud 17 to move out of its position against at least one of the peripheral teeth 21 of the counter disk 23 to thereby release the disk. Release of the counter disk 23 allows a relatively light initializing spring 29 to rotate the counter disk 23 to initialize the disk to its original "E" setting. A stop pin 31 on the underside of the counter disk 23 contacts a fixed pin 33 on a frame portion of the camera to halt the counter disk 23 at its "E" setting and, simultaneously, to close a normally open switch $SW_C$.

When the rear door 5 is re-closed, as shown in FIG. 3, it pivots the swing plate 15 in a clockwise direction about the shaft 7 to return the motion-transmitting stud 17 to its position against at least one of the peripheral teeth 21 of the counter disk 23. A releasable latch is provided to maintain the door 5 closed to hold the motion-transmitting stud 17 in this position.

The take-up spool 1 includes a relieved annular portion 35 on its periphery having a smaller diameter than the remainder of the take-up spool. A film-on-spool sensor 37 is pivotally mounted on a frame portion of the camera by a pivot pin 39 and includes a resiliently flexible sensing finger 41 for sensing the presence and the absence of the filmstrip F on the take-up spool 1. A return spring 45 urges the film-on-spool sensor 37 to normally position an idler roller 47 on a free end of the sensing member 41 in abutment against the relieved annular portion 35 of the take-up spool 1, as shown in FIG. 2. When a leading end portion L of the filmstrip F is initially wound onto the take-up spool 1, a longitudinal section X of the first convolution of the filmstrip will be spaced opposite the relieved annular portion 35. See FIG. 3. The idler roller 47 will ride on the longitudinal section X, thereby being separated from the relieved annular portion 35. This causes the film-on-spool sensor 37 to swing in a clockwise direction about the pivot pin 39 to close a normally open switch $SW_F$.

Figure 4:
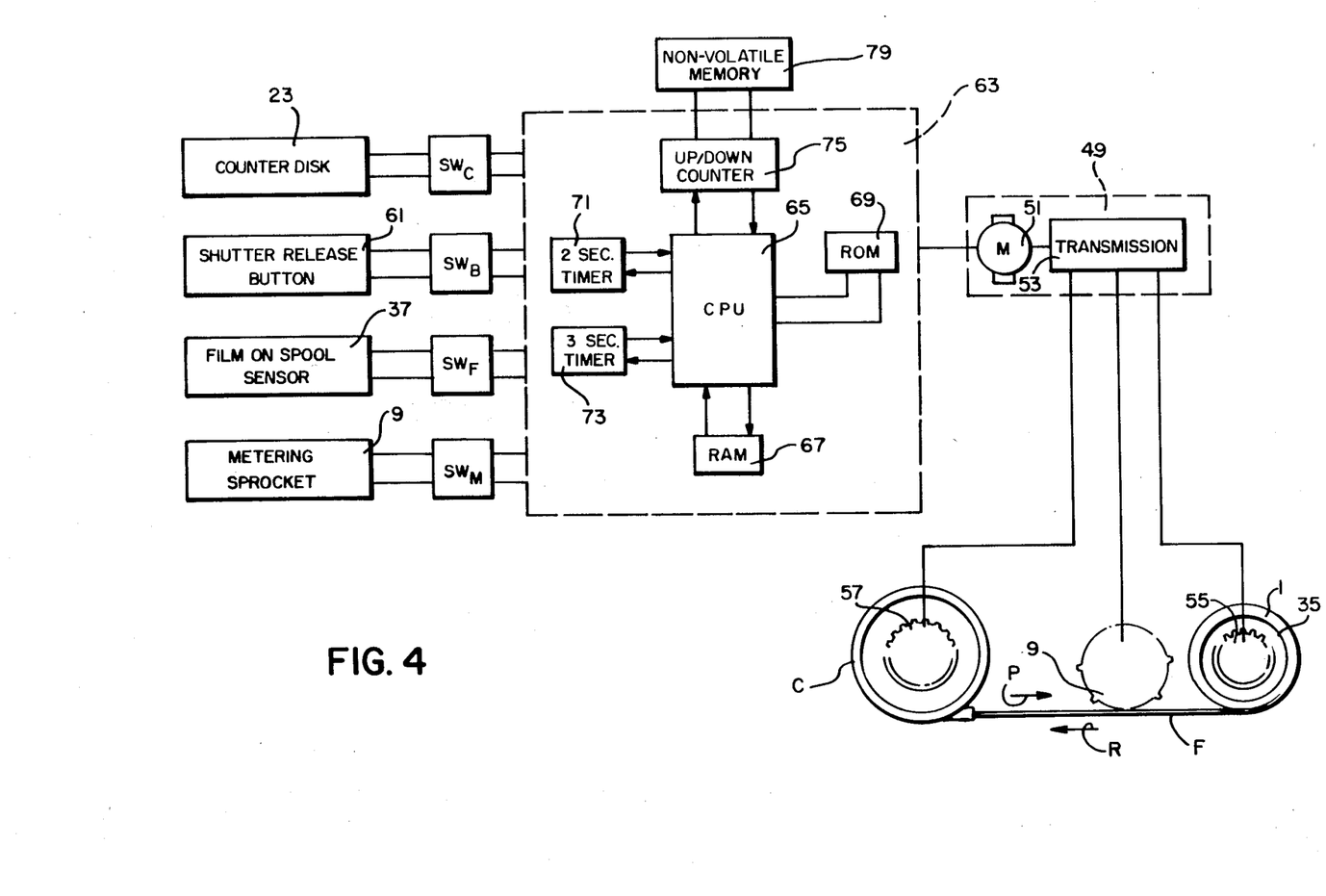
FIG. 4 is a schematic representation of a control circuit included in the improved appparatus.

In FIG. 4, there is schematically depicted a motorized film transport mechanism 49 comprising a conventional bi-directional motor 51 and a conventional drive transmission 53. As shown, the transmission 53 is coupled to the metering sprocket 9 and to respective drive hubs 55 and 57 which engage the take-up spool 1 and a supply spool within the cartridge C. When the cartridge C is loaded in the camera, as shown in FIG. 2, the leading end portion L of the filmstrip F is placed over the metering sprocket 9 to position one or more successive perforations P in the leading end portion in engagement with the sprocket. The motorized film transport mechanism 49 initially rotates the metering sprocket 9 in order to advance the leading end portion L of the filmstrip F onto the take-up spool 1. The take-up spool 1 has respective teeth 59 for engaging the successive perforations P in the leading end portion L of the filmstrip F and is rotated by the motorized transport mechanism 49 at a faster speed than the metering sprocket 9. A film tension responsive clutch or other suitable means in the transmission 53 de-couples the metering sprocket 9 from its rotational drive in response to the resulting pull on the filmstrip F caused by engagement of the leading end portion L of the filmstrip to the faster rotating take-up spool 1. Thereafter, the metering sprocket 9 operates in an idling capacity, that is, it is rotated by movement of the filmstrip F from the cartridge C onto the take-up spool 1 and back into the cartridge.

In addition to the switch $SW_F$ associated with the sensing finger 41 of the film-on-spool sensor 37 and the switch $SW_C$ associated with the stop pin 31 on the underside of the counter disk 23, there are provided respective switches $SW_B$ and $SW_M$ associated with a shutter release button 61 and the metering sprocket 9. The four switches $SW_C$, $SW_B$, $SW_F$, and $SW_M$ are connected to a conventional digital microcomputer 63 such as used in many cameras. The microcomputer 63 includes a central processing unit (CPU) 65, a random access memory (RAM) 67, a read only memory (ROM) 69, a two second timer 71, a three second timer 73, and an up/down counter 75. As is described below, the microcomputer 63 is used to control operation of the motorized film transport mechanism 49 to prewind a substantial length of the filmstrip F onto the take-up spool 1 and to rewind the filmstrip back into the cartridge C. The switch $SW_C$ is closed by the stop pin 31 on the underside of the counter disk 23 when the disk is initialized to its original "E" setting and is opened by separation of the stop pin from the switch when the disk is first rotated by movement of the metering sprocket 9 to prewind the leading end portion L of the filmstrip F onto the take-up spool 1. The switch $SW_B$ is closed each time the shutter release button 61 is depressed by the photographer to initiate a film exposure and is opened when the button is released. The switch $SW_F$ is closed by the sensing finger 41 of the film-on-spool sensor 37 when the sensing finger is moved away from the take-up spool 1 in response to pre-winding of the leading end portion L of the filmstrip F onto the spool and is opened when the sensing finger returns to the spool once the filmstrip is substantially wound off the spool. The switch $SW_M$ is closed by a cam 77 on the shaft 7, as shown in FIG. 1, each time the metering sprocket 9 is rotated a single revolution. When the metering switch $SW_M$ is closed, a metering pulse is generated in the microcomputer 63. The metering pulse is counted up in the up/down counter 75 during pre-winding movement of the filmstrip F, to increment the counter by "1", and is counted down during rewinding movement of the filmstrip, to similarly decrement the counter. A non-volatile memory 79 or other means, such as a back-up battery, is provided to maintain the pulse count in the up/down counter 75 when the camera is shut down and any filmstrip is present on the take-up spool 1.

OPERATION

Figure 5A:
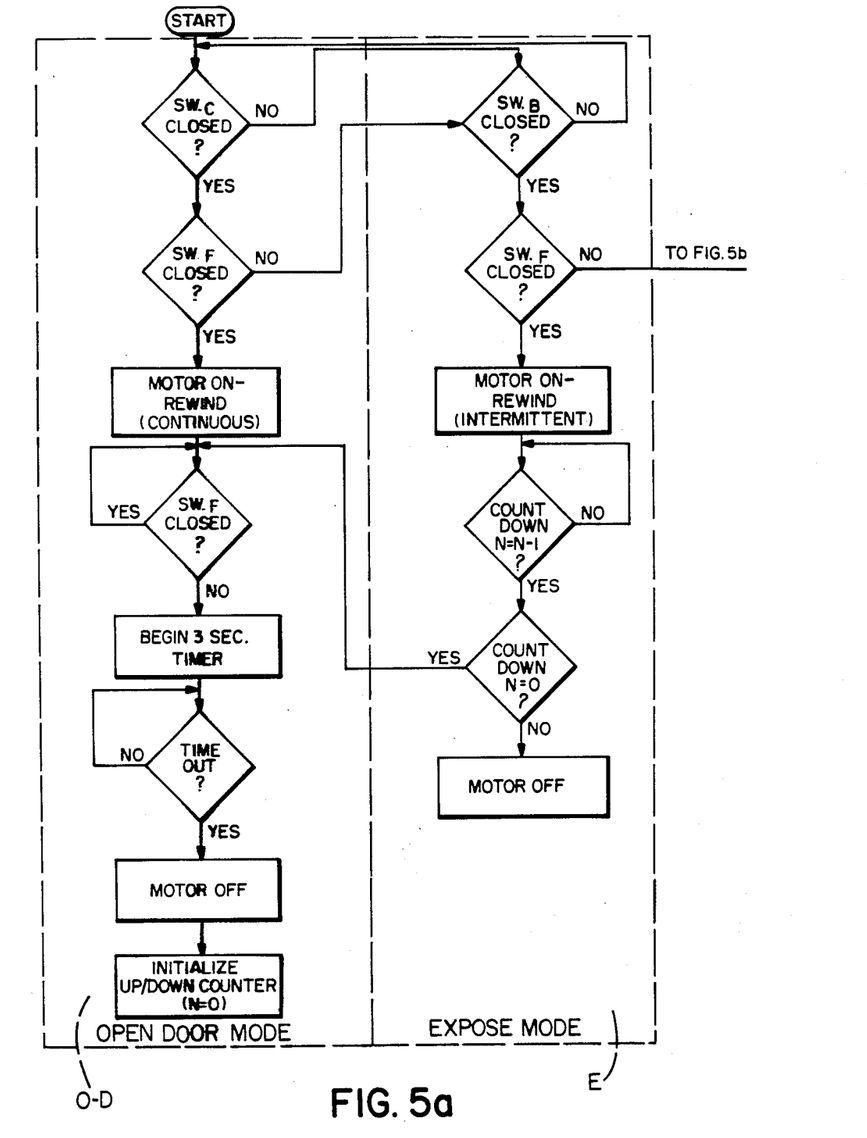
FIGS. 5a and 5b together form a flow chart illustrating operation of the control circuit.
Figure 5B:
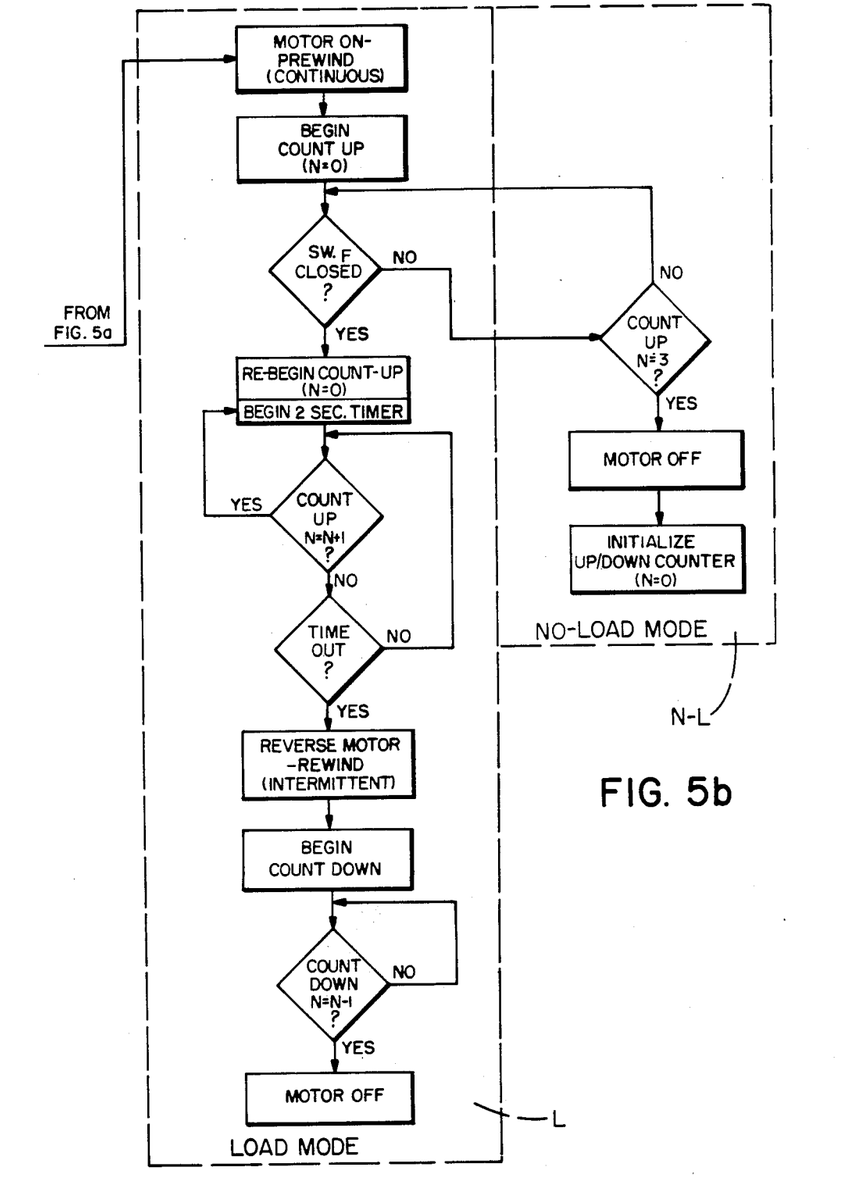

FIGS. 5a and 5b together form a flow chart which illustrates four routines of the microcomputer 63 which are effected in cooperation with the switches $SW_C$, $SW_B$, $SW_F$, and $SW_M$ to control operation of the motorized film transport mechanism 49.

(1) Load Mode

This mode corresponds to the routine L of the microcomputer 63. If the switch $SW_C$ is closed because the counter disk 23 is in its original "E" setting, the switch $SW_F$ is open because no film is present on the take-up spool 1, and the switch $SW_B$ is closed because the shutter release button 61 is depressed, the motor 31 is energized to drive the transmission 53 in a pre-wind direction for film movement as depicted by the arrow P in FIG. 4. At this time, the transmission 53 rotates the metering sprocket 9 and the drive hub 55 for rotating the take-up spool 1. The drive hub 57 for rotating the supply spool within the cartridge C is disconnected from the transmission 53, allowing the supply spool to idle. After the motor 31 is energized, the up/down counter 75 begins to count up from "0" by "1", each time a metering pulse is produced in response to closing of the switch $SW_M$ when the metering sprocket 9 completes a single revolution. If the switch $SW_F$ is closed because the leading end portion L of the filmstrip F has been wound onto the take-up spool 1, the up/down counter 75 re-begins its count up from "0" and the two sec. timer 71 is begun. The substantial length of the filmstrip F, following the leading end portion L, is then pre-wound onto the take-up spool 1. If the up/down counter 75 is incremented by "1" before the two sec. timer 71 times out, the timer is begun again. After the substantial length of the filmstrip F has been pre-wound onto the take-up spool 1, the take-up spool is prevented from withdrawing the remainder of the filmstrip from the cartridge C because a trailing end portion of the filmstrip is attached to the supply spool within the cartridge. This end of film condition causes film movement to stall. As a result, the up/down counter 75 is not incremented by "1" before the two sec. timer 71 times out. This causes the motor 51 first to be de-energized and then to be re-energized in an opposite direction to drive the transmission 53 in a rewind direction for film movement as depicted by the arrow R in FIG. 4. The reversed transmission 53 pivots a gear or the like into driving relation with the drive hub 57 for the supply spool within the cartridge C, causing the hub and the spool to be rotated by the transmission. Simultaneously, the up/down counter 75 begins a countdown of the metering pulses from its total count obtained during pre-winding. When the up/down counter 75 is decremented by "1", the first frame of the filmstrip F will be in the focal plane of the taking lens. Then, the motor 51 is de-energized, thereby concluding the load mode L.

(2) No-Load Mode

This mode corresponds to the routine N-L of the microcomputer 63. If, in the load mode L, the switch $SW_F$ is open because the leading end portion L of the filmstrip F is not wound onto the take-up spool 1 after the motor 51 is energized to drive the transmission 53 in the pre-wind direction and if, in the no-load mode N-L, the up/down counter 75 counts up to "3", but the switch $SW_F$ has not closed because the take-up spool remains empty, the motor is de-energized and the counter is reset to "0", thereby concluding the no-load mode.

(3) Expose Mode

This mode corresponds to the routine E of the microcomputer 63. If the switch $SW_C$ is open because the counter disk 23 is in a numbered setting, rather than in its original "E" setting, the switch $SW_B$ is closed because the shutter release button 61 is depressed, and the switch $SW_F$ is closed because film is present on the take-up spool 1, the motor 31 is energized to drive the transmission 53 in the rewind direction. As a result, the supply spool within the cartridge C is rotated by the drive hub 57 to rewind an exposed frame into the cartridge, and the take-up spool 1 is rotated by the drive hub 55 to advance a fresh frame off the take-off spool and into the focal plane of the taking lens. When the up/down counter 75 is decremented by "1", but the counter has not dropped to "0", the motor 51 will be de-energized, thereby concluding the exposure mode E. Otherwise, if the up/down counter 75 has dropped to "0", then, when the switch $SW_F$ is closed because the filmstrip F has been completely wound off the take-up spool, the three sec. timer 73 is begun. When the three sec. timer 73 times out, the leading end portion L of the filmstrip F will have been rewound into the cartridge C. Then, the motor 51 is de-energized and, merely as a precaution, the up/down counter 75 is re-initialized thereby concluding the exposure mode.

(4) Open Door Mode

This mode corresponds to the routine O-D of the microcomputer 63. If the switch $SW_C$ is closed because the counter disk 23 is in its original "E" setting, but the switch $SW_F$ is closed because film is present on the take-up spool 1, such as in the event the rear door 5 is accidentally or inadvertently opened before the filmstrip F is completely wound off the take-up spool 1, the motor 51 is energized to drive the transmission 53 in the rewind direction. Then, only when the switch $SW_F$ is opened because the remaining film has been wound off the take-up spool 1, the three sec. timer 73 is begun. When the three sec. timer 73 times out, the leading end portion L of the filmstrip F will have been rewound into the cartridge C. Then, the motor 51 is de-energized and, merely as a precaution, the counter 75 is re-initialized, thereby concluding the open door mode.

The invention has been described with reference to a preferred embodiment. However, it will be appreciated that variations and modifications can be effected within the ordinary skill in the art without departing from the scope of the invention. For example, a combination of logic gates or switching circuits which make digital decisions may be used in controlling operation of the motorized film transport mechanism 49. In another example, a tension sensing member responsive to the sudden increase in film tension arising at the end of pre-winding, when the take-up spool 1 attempts to withdraw the remainder of the filmstrip F from the cartridge C, may be used to reverse the motor 51. In a third example, the up/down counter 75 may be connected to a decoder which, in turn, is connected to a liquid crystal display or a light emitting diode array to provide an indication of the frame count.

I claim:

1. An improved photographic camera of the type wherein (a) a motorized film transport is operable to continuously prewind substantially the entire length of an unexposed filmstrip from a light-tight cartridge onto a take-up spool without exposing the filmstrip and to intermittently rewind the filmstrip one frame at a time back into the cartridge after each exposure, (b) a frame counter is incremented during prewinding of the filmstrip onto said take-up spool to provide a count of a maximum number of frames to be exposed and is decremented during rewinding of the filmstrip back into the cartridge after each exposure to provide a count of the number of frames which remain to be exposed, (c) a door is openable to load the cartridge into said camera and to remove the cartridge from said camera, and (d) means responsive to the opening of said door prematurely with substantially any filmstrip wound on said take-up spool initializes said frame counter to an original setting, and wherein the improvement comprises:

first sensing means for sensing that said frame counter is initialized to its original setting by said initializing means;

second sensing means for sensing the presence of substantially any filmstrip wound on said take-up spool; and control means cooperating with said first and second sensing means in response to said frame counter being initialized to its original setting when substantially any filmstrip is wound on said take-up spool, for operating said motorized film transport to continuously rewind the filmstrip remaining on said spool back into the cartridge.

2. The improvement as recited in claim 1, wherein said second sensing means includes a sensing member normally urged into abutment against said take-up spool and mounted for movement away from the spool by the winding of substantially any filmstrip onto said spool.

3. An improved photographic camera of the type wherein (a) a motorized film transport is operable to continuously prewind substantially the entire length of an unexposed filmstrip from a light-tight cartridge onto a take-up spool without exposing the filmstrip and to intermittently rewind the filmstrip one frame at a time back into the cartridge after each exposure, (b) a frame counter is incremented during prewinding of the filmstrip onto said take-up spool to provide a count of a maximum number of frames to be exposed and is decremented during rewinding of the filmstrip back into the cartridge after each exposure to provide a count of the number of frames which remain to be exposed, (c) a door is openable to load the cartridge into said camera and to remove the cartridge from said camera, and (d) means responsive to the opening of said door prematurely with substantially any filmstrip wound on said take-up spool initializes said frame counter to an original empty setting, and wherein the improvement comprises:

first sensing means for sensing that said frame counter is initialized to its original empty setting by said initializing means;

second sensing means for sensing the presence of substantially any filmstrip wound on said take-up spool; and control means cooperating with said first and second sensing means in response to said frame counter being initialized to its original empty setting when substantially any filmstrip is wound on said take-up spool, for operating said motorized film transport to continuously rewind the filmstrip remaining on said spool back into the cartridge, and then when said spool is empty, for discontinuing operation of said motorized film transport.

4. The improvement as recited in claim 3, wherein said frame counter includes a counter disk rotatable from said original empty setting for indicating the frame count and a motion-transmitting member normally engaging said disk to rotate the disk, said motion-transmitting member being supported for movement responsive to the opening of said door to disengage from said counter disk to permit said disk to be initialized to its original empty setting, and wherein said first sensing means is disposed to sense rotation of said counter disk to its original empty setting.

5. An improved photographic camera of the type wherein (a) a motorized film transport is operable to continuously prewind substantially the entire length of an unexposed filmstrip from a light-tight cartridge onto a take-up spool without exposing the filmstrip and to intermittently rewind the filmstrip one frame at a time back into the cartridge after each exposure, (b) a frame counter is incremented from an original setting during prewinding of the filmstrip onto said take-up spool to provide a count of a maximum number of frames to be exposed and is decremented during rewinding of the filmstrip back into the cartridge after each exposure to provide a count of the number of frames which remain to be exposed, (c) a door is openable to load the cartridge into said camera and to remove the cartridge from from said camera, and (d) means responsive to the opening of said door prematurely with substantially any filmstrip wound on said take-up spool initializes said frame counter to its original setting, and wherein the impprovement comprises:

first switching means responsive to said frame counter being initialized to its original setting by said initializing means for changing to a predetermined state;

second switching means responsive to the presence and the absence of substantially any filmstrip on said take-up spool for changing to said first and second states, respectively; and control means cooperating with said first and second switching means initially in response to said first switching means changing to its predetermined state when said second switching means is in its first state, for operating said motorized film transport with said door open to continuously rewind substantially any filmstrip on said take-up spool back into the cartridge, and then in response to said second switching means changing to its second state, for discontinuing operation of said motorized film transport.

6. An improved photographic camera of the type wherein (a) a motorized film transport is operable to continuously prewind substantially the entire length of an unexposed filmstrip from a light-tight cartridge onto a take-up spool without exposing the filmstrip and to intermittently rewind the filmstrip one frame at a time back into the cartridge after each exposure, (b) a frame counter is incremented from an original empty setting to successive higher numbered settings during prewinding of the filmstrip onto said take-up spool to provide a count of a maximum number of frames to be exposed and is decremented to successive lower numbered settings during rewinding of the filmstrip back into the cartridge after each exposure to provide a count of the number of frames which remain to be exposed, (c) a door is openable to load the cartridge into said camera and to remove the cartridge from said camera, and (d) means responsive to the opening of said door prematurely with substantially any filmstrip wound on said take-up spool initializes said frame counter from a numbered setting to its original empty setting, and wherein the improvement comprises:

first switching means responsive to said frame counter being initialized to its original empty setting by said initializing means for changing to a first state and responsive to said counter incrementing from the empty setting for changing to a second state;

second switching means responsive to the presence and the absence of substantially any filmstrip on said take-up spool for changing to first and second states, respectively, and control means cooperating with said first and second switching means when said first switching means is in its first state and said second switching means is in its second state, for operating said motorized film transport to continuously prewind substantially the entire length of the filmstrip onto said take-up spool, when said first switching means is in its second state and said second switching means is in its first state, for operating said motorized film transport to intermittently rewind the filmstrip back into the cartridge, and when said first and second switching means are each in their first states, for operating said motorized film transport to continuously rewind the filmstrip back into the cartridge.

* * * * *